Figure 1:
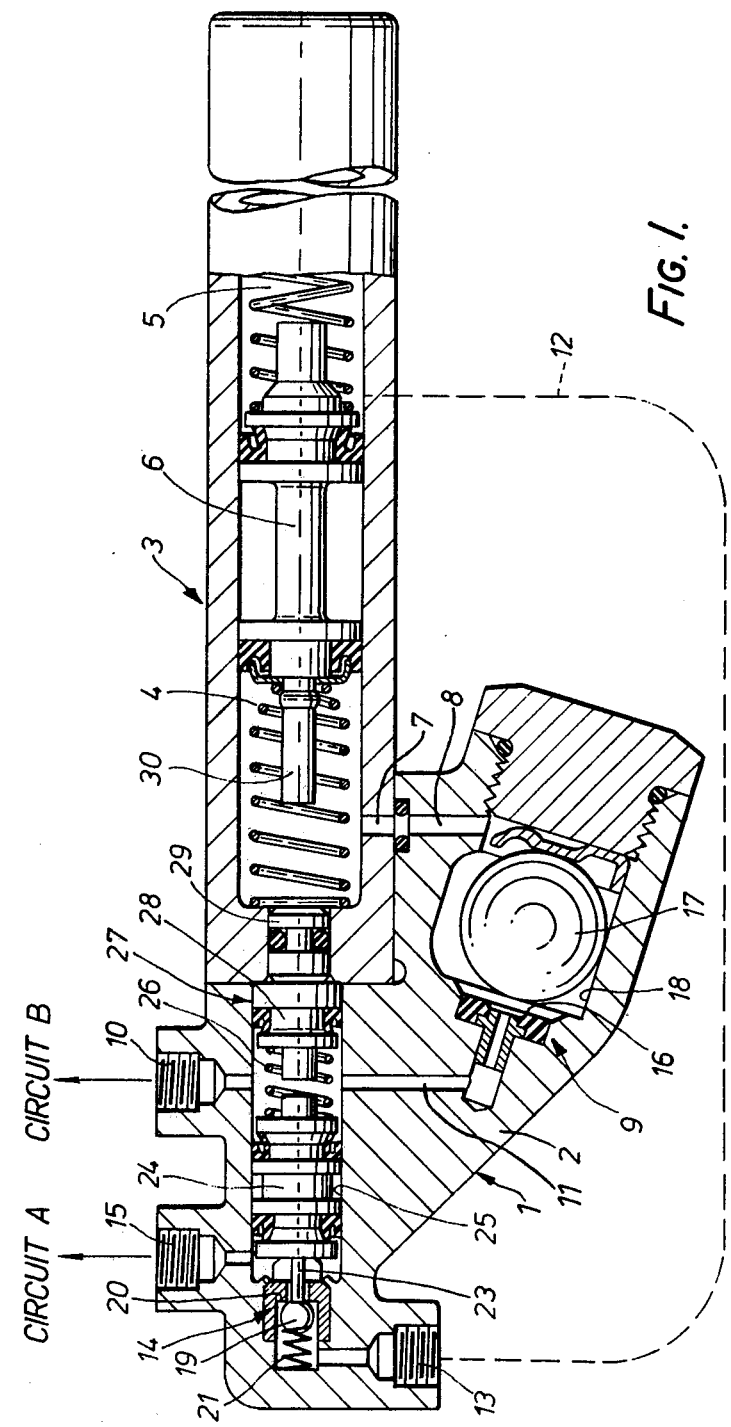

United States Patent [19]

Farr

[11] 4,273,386
[45] Jun. 16, 1981

[54] CONTROL VALVE ASSEMBLIES

[75] Inventor: Glyn P. R. Farr, Warwich, England

[73] Assignee: Lucas Industries Limited, Birmingham, England

[21] Appl. No.: 107,826

[22] Filed: Dec. 28, 1979

[30] Foreign Application Priority Data

Jan. 22, 1979 [GB] United Kingdom ............... 02229/79

[51] Int. Cl.³ ............................................... B60T 8/26
[52] U.S. Cl. .................................... 303/6 C; 188/349; 303/24 A; 303/24 F
[58] Field of Search .................. 303/6 C, 24 A, 24 C, 303/24 F, 84 A; 188/349, 345, 151 A; 60/562, 561, 582, 591; 137/38, 45-46

[56] References Cited

U.S. PATENT DOCUMENTS

| 3,097,018 | 7/1963 | Stelzer | 303/24 F X |
| 3,977,731 | 8/1976 | Kasahara | 303/6 C |

Primary Examiner—Douglas C. Butler
Attorney, Agent, or Firm—Scrivener, Clarke, Scrivener and Johnson

[57] ABSTRACT

A control valve assembly for a dual circuit braking system has two valves controlling the pressure in the respective circuits. In order to ensure substantially equal braking pressures in the circuits, a pressure equalizing piston is provided which is free floating in a bore interconnecting outlets of the valve assembly. The braking pressure can thus be equalized even after closure of the valves. One valve is preferably inertia-responsive.

10 Claims, 3 Drawing Figures

CONTROL VALVE ASSEMBLIES

This invention relates generally to vehicle dual circuit braking systems and particularly to control valve assemblies for such systems.

Known dual circuit braking systems commonly include control valves to reduce or limit the pressure applied to the rear brake cylinders as compared to the full braking pressure applied to the front brake cylinders. In an 'X'-split system, for example, there are two circuits, one of which is connected to the nearside front wheel brake cylinders and to the offside rear wheel brake cylinders and the other of which is connected to the offside front wheel brake cylinders and the nearside rear wheel brake cylinders. Two control valves have previously been used for such a system, one valve being connected in each circuit.

The control valves may be inertia responsive and operate in response to a predetermined deceleration of the vehicle, each valve comprising a ball, which is usually a large steel ball, that is movable to open and close the valve to thereby control the pressure supplied to the rear wheel brake cylinders. For an 'X'-split system two such valves are usually incorporated in a single unit which is bulky, since it houses two large steel balls, and which is heavy and expensive.

An aim of one aspect of the present invention is to provide an inertia responsive control valve assembly for a dual circuit braking system, particularly but not exclusively for an 'X'-split system, in which only a single inertia responsive valve is used.

In accordance with one aspect of the present invention, there is provided a control valve assembly for a vehicle dual circuit braking system, comprising a first inlet and outlet for connection in a first said circuit, a first, inertia responsive control valve for controlling communication between the first inlet and outlet, a second inlet and outlet for connection in a second said circuit, a second control valve operable in response to pressure prevailing in said first circuit to control communication between the second inlet and outlet, and disabling means for holding the second valve open in the event of failure of the pressure in the first circuit.

Another problem in controlling pressure supplied to rear wheel brakes connected respectively in different braking circuits is that control valves for the respective circuits do not operate absolutely simultaneously and it is possible to lock a greater pressure in one circuit than in the other, with the result that the rear wheel brakes are operated at different pressures. This gives rise to unequal braking and possible yawing of the vehicle.

An aim of another aspect of the present invention is to ensure equal braking pressure in both circuits.

Thus, in accordance with another aspect of the invention, there is provided a control valve assembly for a vehicle dual circuit braking system having a first inlet and outlet for connection in a first said circuit, a first control valve controlling communication between the first inlet and outlet, a second inlet and outlet for connection in said second circuit, a second control valve operable in response to pressure prevailing in said first circuit to control communication between the second inlet and outlet, and pressure equalizing means separating the first and second outlets.

The first control valve may be an inertia responsive valve, as described above, a pressure reducing valve, or a pressure limiting valve.

The pressure equalizing means may be a floating piston sealingly slidable in a bore extending between the outlets.

Said free floating piston is preferably moveable to open and close the control valve and is preferably axially aligned with a differential area piston arrangement, subjected over its larger cross-sectional area to the pressure at said first outlet and over its smaller area to the pressure at said first inlet, the piston arrangement being movable in the event of pressure failure in said first circuit to engage the floating piston and thereby hold the control valve open.

The control valve assembly is preferably fast with a master cylinder, the smaller area portion of the piston arrangement extending into a pressure chamber of the master cylinder and being engageable by a piston of the master cylinder, in the event of pressure failure in the first circuit, to urge the piston arrangement into engagement with the floating piston, and thereby hold the control valve open.

Figure 2:
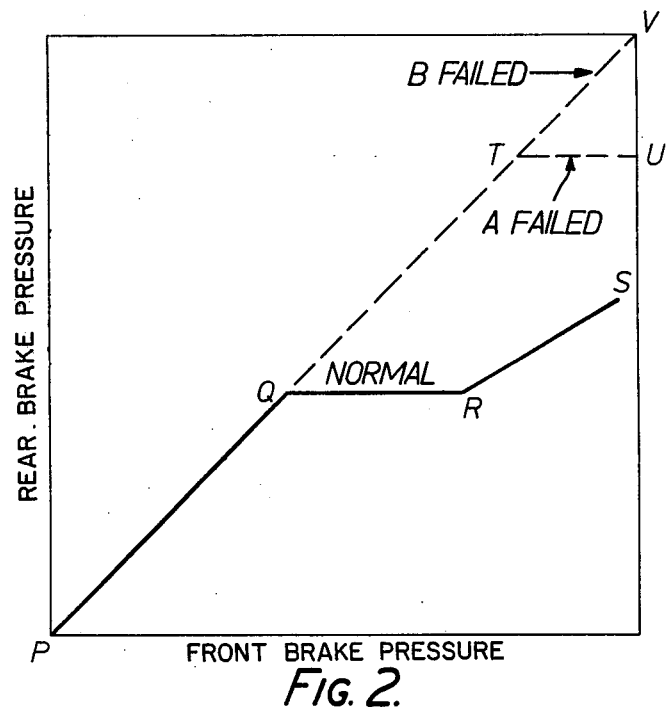
Figure 3:
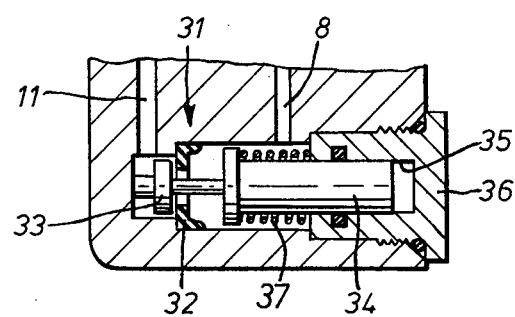

A master cylinder and control valve assembly in accordance with the invention for a vehicle 'X'-split dual circuit braking system, and a modification thereof, will now be described, by way of example, with reference to the accompanying drawings, in which:

FIG. 1 is an axial cross-section of the master cylinder and control valve assembly, FIG. 2 is a curve of rear brake pressure vs. front brake pressure using the assembly of FIG. 1, and FIG. 3 is a detail section illustrating the modification.

The control valve assembly 1 has a housing 2 secured to the end of the master cylinder 3 which has two pressure chambers 4,5 and two actuating pistons 6, only one of which is shown. Chamber 4 has one outlet (not shown) connected to the brake cylinders of one front wheel and another outlet 7 connected to an inlet 8 of the valve assembly 1, the inlet 8 communicating, through an inertia-responsive valve 9, and a passageway 11, with an outlet 10 connected in use to the brake cylinders of one rear wheel. Similarly, chamber 5 has one outlet (not shown) connected to the brake cylinders of the other front wheel and another outlet connected through a line 12 with another inlet 13 of the valve assembly, the inlet 13 communicating through a control valve 14 with an outlet 15 connected in use to the brake cylinders of the other rear wheel. Thus, there are two separate braking circuits which are referred to herein as A and B.

The inertia valve 9 comprises a seat 16 engageable by an inertia member in the form of a ball 17 that can roll on a sloping surface 18. When the deceleration of the vehicle reaches a predetermined value, usually 0.3 g, the ball 17 rolls up the surface 18 to close the valve.

The control valve 14 comprises a ball 19 which is biased into engagement with a seat 20 by a spring 21. The ball 19 is usually held off its seat 20 by a rod 23, rod 23 being engaged by, or attached to, a free-floating piston 24 which is sealingly slidable in an axial bore 25 and which separates the outlets 10 and 15. A coil compression spring 26 urges the free piston 24 to the left in a sense to hold the control valve 14 open and also acts on a piston arrangement 27 comprising a larger cross-sectional area piston 28 which is subjected to the pressure at outlet 10 and a smaller cross-sectional area piston 29 which can extend into the chamber 4 and is subjected to the pressure prevailing in that chamber.

In normal operation of the master cylinder 3, full braking pressure is applied to both front wheel brakes and through the valves 9,14 to the respective rear wheel brakes, as shown by line PQ in FIG. 2. When the predetermined deceleration of the vehicle is attained, the inertia valve 9 closes to prevent further pressure fluid passing from inlet 8 to outlet 10 and thus to the rear wheel brake of circuit B. The differential pressure across free piston 24 moves that piston to the right and thereby closes the control valve 14 and limits the pressure applied to the rear wheel brake of circuit A. The piston 24 ensures equalization of the pressures at outlets 10 and 15, and thus at both rear wheel brakes, this stage of operation being shown at QR in FIG. 2.

When the pressure in the master cylinders has increased sufficiently so that the force of the pressure in chamber 4 acting on smaller piston 29 is sufficient to overcome the force of the pressure at outlet 10 acting on the larger piston 28 together with the force of spring 26 then the piston arrangement 27 moves to the left to increase the pressure at outlet 10. That increase in pressure moves the free piston 24 to the left to open the control valve 14 and increase the pressure at outlet 15 causing the piston 24 to move to the right to close the control valve 15 and so on. Thus, as the master cylinder pressure increases, the piston 24 meters the fluid to the outlet 15 at a reduced rate as compared to full master cylinder pressure, the pressures at outlets 10 and 15 being equalized by the piston 24. The metering effect is shown at RS in FIG. 2.

In the event of the failure of circuit A, the circuit B is operative and the inertia valve 9 will close at twice the pressure at which it normally closes, the point of closure being indicated by T in FIG. 2. Thereafter, the pressure curve follows TU, which is equivalent to the portion QR in the unfailed case.

Should the circuit B fail, the master cylinder piston 6 bottoms in the cylinder during operation and an extension 30 of the piston engages the piston arrangement 27 which in turn engages the free piston 24, urging the latter to the left to hold control valve 14 open. The rear brake of circuit A is thus fully applied, as shown by PV in FIG. 2.

The above-described assembly has the advantage that should the inertia valve 9 close prematurely, for example due to a change down in gear immediately prior to braking, then pressure will be passed to the rear wheel brake of circuit B by displacement of the piston arrangement 27 to the left due to an increase in pressure in chamber 4, and to the rear wheel brake of circuit A by metering of the control valve 14. Furthermore, since only one inertia valve 9 is used and the piston 24 is between the circuits, the rear brake pressure is the same in both circuits. In known systems in which two inertia valves are used, the valves do not usually close simultaneously because tolerances, such as on ramp angle and on the distance of the ball from the seat, affect the moment of closure.

Another advantage of the above described assembly is that all the pistons 24,28,29 operate during normal braking and not only when there is a failure. Thus, the possibility of seizing of the pistons due to non-use is eliminated.

FIG. 3 illustrates how the inertia valve 9 of FIG. 1 may be replaced by a pressure limiting valve. The construction of the remainder of the master cylinder and control valve assembly is exactly as described with reference to FIG. 1, only the valve arrangement between inlet 8 and passageway 11 being different. The limiting valve comprises an annular valve seat 32 engageable by a valve head 33 carried by a member 34 which is sealingly slidable in a bore 35 formed in a closure plug 36. The member 34 is biased by a spring 37 into engagement with the housing 2. The valve 31 controls communication between the inlet 8, which is connected to chamber 4 of the master cylinder, and outlet passageway 11, which is connected to outlet 10.

In operation, when inlet pressure acting on the effective area of member 34 is sufficient to overcome the force of the spring 37, the member 34 moves to the right as seen in FIG. 3 and closes the valve. Further increase in inlet pressure then does not increase the pressure at outlet 10. Operation of the assembly incorporating the limiting valve 31 will be apparent to those skilled in the art having regard to the description with reference to FIG. 1 and further description is not necessary here.

It will be apparent that the pressure limiting valve 31 could be replaced by a pressure reducing valve.

The above described assemblies have the advantage that the breaking pressure in both circuits is equal even after valve closure. In previously proposed control valve assemblies having two control valves for respective circuits, the valves do not operate absolutely simultaneously and it is possible to lock a greater pressure in one circuit than in the other.

I claim:

1. A control valve assembly for a vehicle braking system having first and second pressure circuits, said assembly comprising a first inlet and a first outlet for connection in said first circuit, a first, inertia-responsive control valve for controlling communication between said first inlet and outlet, a second inlet and a second outlet for connection in said second circuit, a second control valve operable in response to pressure prevailing in said first circuit to control communication between said second inlet and outlet, and disabling means for holding said second valve open in the event of failure of the pressure in said first circuit.

2. A control valve assembly according to claim 1, including equalizing means which ensures equalization of the pressures at said outlets in normal operation.

3. A control valve assembly according to claim 2, including means defining a bore extending between said first and second outlets, wherein said pressure equalizing means comprises a pressure operable member working in said bore extending between the outlets.

4. A control valve assembly according to claim 3, wherein said pressure operable member is a free floating piston which is movable to open and close said second control valve.

5. A control valve assembly according to claim 4, including a differential-area piston arrangement which co-operates with said free-floating piston and which is movable in the event of pressure failure in the first circuit to move said floating piston and hold said second control valve open.

6. A control valve assembly according to claim 5, wherein said floating piston is axially aligned with said piston arrangement.

7. A control valve assembly according to claim 6, wherein said floating piston and said piston arrangement are axially aligned with said second control valve, said first control valve being transversely offset from the axis of alignment.

8. A control valve assembly according to claim 5, wherein said piston arrangement has portions of different cross-sectional area, the larger area portion being subjected to the pressure at said first outlet and the smaller area portion being subjected at all times to the pressure at said first inlet.

9. The control valve assembly of claim 1 wherein said inlets are each constructed and arranged to receive pressurized fluid and each of said control valves are disposed between the respective inlets and outlets to control the flow of pressurized fluid from said inlets to the respective outlets.

10. A master cylinder and a control valve assembly for a vehicle braking system having first and second circuits, said master cylinder being fast with said assembly, said control valve assembly comprising a first inlet and a first outlet for connection in said first circuit, a first, inertia-responsive control valve for controlling communication between said first inlet and outlet, a second inlet and a second outlet for connection in said second circuit, a second control valve operable in response to pressure prevailing in said first circuit to control the flow by pressurized fluid between said second inlet and outlet, equalizing means for ensuring equalization of the pressures at said outlets in normal operation, said equalization means comprising bore extending between said first and second outlets, and a free floating piston working in said bore and being movable to open and close said second control valve, a differential-area piston arrangement co-operating with said free-floating piston, a larger area portion of said differential-area piston arrangement being subjected to the pressure at said first outlet and a smaller area portion being subjected to the pressure at said first inlet, said master cylinder having a piston defining a pressure chamber, said smaller area portion of said piston arrangement extending into said pressure chamber and being engageable by said piston of the master cylinder, in the event of pressure failure in said first circuit, to urge said piston arrangement into engagement with said floating piston, and thereby hold said second control valve open.

* * * * *